United States Patent Office 2,780,278
Patented Feb. 5, 1957

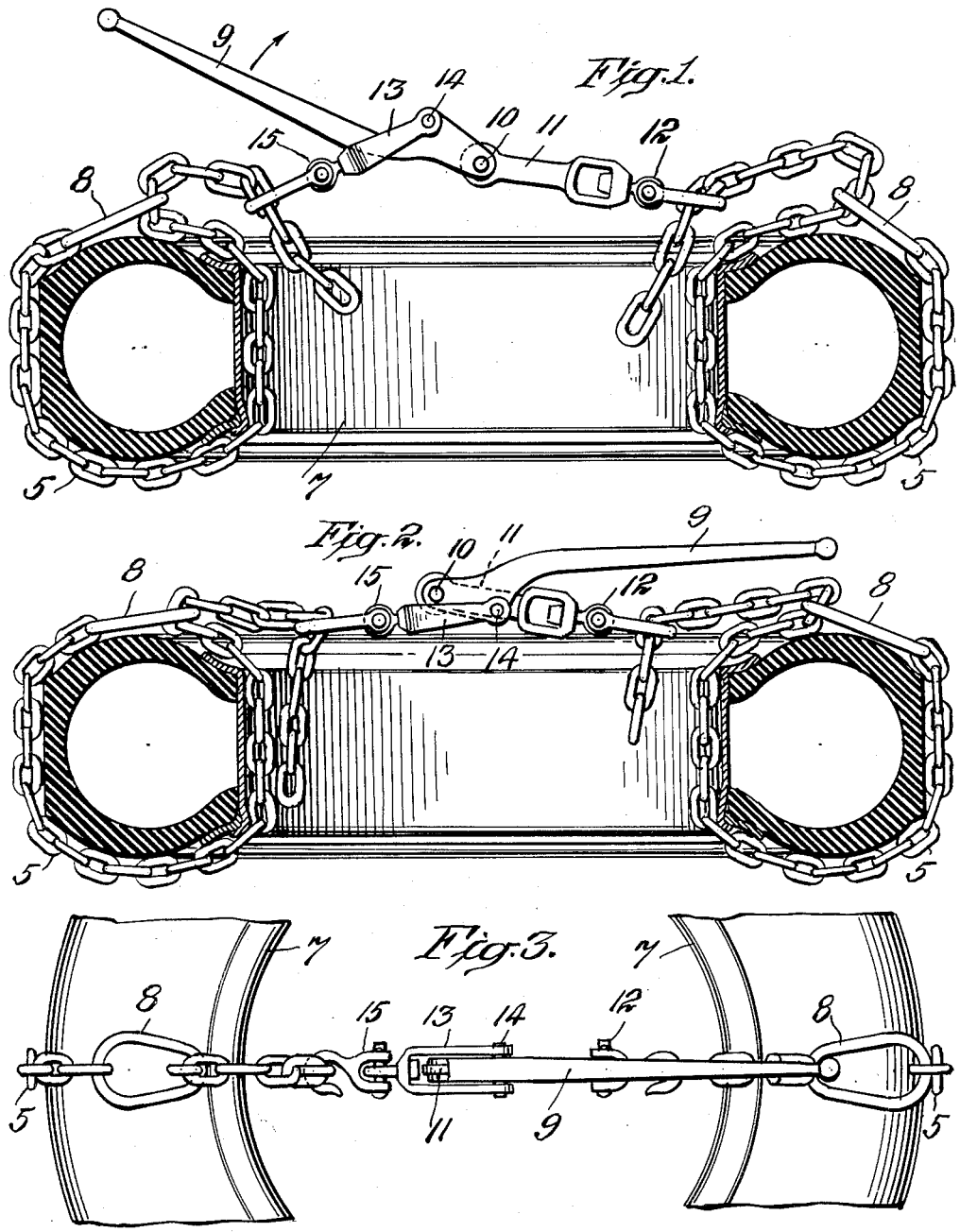

2,780,278

SAFETY GUARD FOR TIRE INFLATION

Otto Olsen, Brooklyn, N. Y., assignor to Regent Wire and Rope Works, New York, N. Y., a partnership Application December 30, 1954, Serial No. 478,703

1 Claim. (Cl. 157—1)

The invention herein disclosed is a guard construction for preventing accidents from tires, and particularly heavy truck tires, blowing off the rims during inflation. In such accidents the bead ring and lock ring or combination bead and lock ring, depending on type of rim or wheel, are usually thrown off with destructive force and injury to operators and surroundings.

It is a primary purpose of the invention to provide a guard of simple construction, easily handled and which can be quickly applied, which will positively prevent accidents such as described and which after it has thus served its purpose may be as quickly and easily removed from the tire.

Further special objects of the invention are to provide such a safety guard in a light, inexpensive form which can be readily handled by one man and which will not take up much space and therefore can be readily stored out of the way when not in actual use.

Other desirable objects attained by the invention and the novel features of the construction, combination and relation of parts by which the purposes of the invention are accomplished, are set forth or will appear in the course of the following specification.

The drawing accompanying and forming part of the specification illustrates a present practical embodiment of the invention. Structure, however, may be modified and changed as regards this illustration, all within the true intent and broad scope of the invention as hereinafter defined and claimed.

Fig. 1 in the drawing is a cross-sectional view of a tire on a rim, showing the guard in place and ready to be secured;

Fig. 2 is a similar view showing the toggle lever swung over from the open position, Fig. 1, to a closed, holding position;

Fig. 3 is a broken top plan view showing the guard closed and secured about the tire.

As shown in Fig. 1, the guard comprises two lengths of chain 5 which can be passed about a tire 6 and rim 7 on which it may be mounted and which carry end rings or loops 8 through which the free ends of the chains may be passed and then be pulled together to tighten and hold the chain thus looped about the tire.

As a practical matter it is preferred to use a toggle for tightening and securing the two loops of chain.

This toggle is shown as comprising a hand lever 9 fulcrumed at the end at 10 to a link 11 carrying a swivel hook 12 engageable with the links of one chain and having a second link 13 pivoted thereto at an intermediate point 14 offset from the first pivot and carrying a swiveled hook 15 engageable with links of the other chain.

The link 13, as shown in Fig. 3, is of the open shackle type enabling the lever as it fulcrums about the pivot point 14, Fig. 1, to carry the other pivot 10 past the dead-center position as in Figs. 2 and 3, to lock the toggle in the closed, holding position. In this action the end of the lever first fulcrums about the pivot center 10 and then fulcrums about the intermediate pivot 14 to reach the over-center, locked position illustrated in Fig. 2.

In this tightening or closing action of the toggle the loops of chain are tightened about the opposite sides of the tire, with the lock and bead rings secured against any possible detachment from the rim or wheel.

This, then, makes it perfectly safe to inflate the tire to any required pressure. If in this operation there is any slip or release of bead or lock rims it can only be of a slight extent and there can be no escape from the rim or wheel.

In applying the guard the chain can be loosely looped about the tire and hooks of the toggle in open position be caught over conveniently located links of the chain, as in Fig. 1. Then, upon swinging the hand lever 9 over to the toggle closed position, Figs. 2 and 3, the running loops of chain will be secured more or less tightly about the tire. As the tire is inflated the chains will be tightened to some extent so that the initial tightening effected by the toggle will be increased and the locking of the guard in place be thereby further made sure.

Once inflation is completed it is perfectly safe to remove the guard and this can be accomplished by simply swinging the hand lever 9 from the toggle locked position, Fig. 2, back to the open position, Fig. 1, whereupon in the latter condition the hooks of the toggle may be detached from the chains and the chains slipped off the tire.

If because of a bent ring or any other failure there is any indication of a break, the guard chains will hold the parts in place until the tire can be deflated and whatever correction is necessary be made.

Each length of chain is in effect a separate slip noose, free to adjust itself to close, firm encirclement of the tire and rim. These two chains with the toggle take up little room and so when removed can be readily stored in any convenient small space.

The invention provides a highly desirable safety precaution and one which can be quickly applied about and be easily removed from the tire. The toggle operation is of great advantage in that inflation of the tire further tightens the chains and the opening of the toggle releases this additional tension, enabling quick and easy disconnection and removal of the chains.

What is claimed is:

A safety device for use in inflating tires comprising a pair of link chains, a ring secured to one end of each chain, the free end of each chain passing through the respective ring on that chain, a self-locking hand lever toggle assembly including a lever arm and a pair of toggle links secured thereto, a swivel hook secured to each of said toggle links whereby each hook may be pivoted and rotated relative to the associated toggle link, said hooks being engaged each with a link at the free end of one of said chains whereby the chains may be looped around diametrically opposite points of a tire and rim and be tightened therearound by operation of the hand lever of said toggle assembly.

References Cited in the file of this patent

UNITED STATES PATENTS

| | | |
|---|---|---|
| 642,214 | Enright | Jan. 30, 1900 |
| 841,726 | Shaw | Jan. 22, 1907 |
| 1,063,738 | Ruland | June 3, 1913 |
| 1,168,097 | Morey | Jan. 11, 1916 |
| 1,829,433 | Armstrong | Oct. 27, 1931 |
| 2,422,001 | Durbin | June 10, 1947 |
| 2,710,054 | Merriman | June 7, 1955 |